(12) United States Patent
Weichholdt et al.

(10) Patent No.: US 7,399,223 B2
(45) Date of Patent: Jul. 15, 2008

(54) SIEVE WITH DIFFERENT LOUVERS

(75) Inventors: Dirk Weichholdt, Sarreguemines (FR); Harald Grossjohann, Zweibrücken (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/451,823

(22) Filed: Jun. 13, 2006

(65) Prior Publication Data
US 2006/0287019 A1   Dec. 21, 2006

(30) Foreign Application Priority Data
Jun. 16, 2005   (DE)   ................. 10 2005 027 741

(51) Int. Cl.
*A01F 12/32* (2006.01)
*B07B 1/00* (2006.01)

(52) U.S. Cl. ............................. 460/101; 209/395

(58) Field of Classification Search ............... 460/101, 460/102, 97, 119, 120; 209/394, 395, 139.1, 209/28, 321
See application file for complete search history.

(56) References Cited

U.S. PATENT DOCUMENTS

| | | | |
|---|---|---|---|
| 925,623 A * | 6/1909 | Closz | .......................... 209/394 |
| 2,105,986 A * | 1/1938 | Petersen | ...................... 209/394 |
| 2,335,416 A * | 11/1943 | Holtzmann | .................. 209/394 |
| 3,043,427 A | 7/1962 | Eisert | |
| 3,374,886 A | 3/1968 | Lightsey | |
| 4,511,466 A | 4/1985 | Jones et al. | |
| 5,403,235 A * | 4/1995 | Baumgarten et al. | ......... 460/101 |
| 6,053,812 A | 4/2000 | Loewen et al. | |
| 6,632,136 B2 * | 10/2003 | Anderson et al. | ............ 460/101 |
| 6,890,253 B2 * | 5/2005 | Mammen et al. | ............ 460/101 |

FOREIGN PATENT DOCUMENTS

| | | |
|---|---|---|
| DE | 1 607 633 | 2/1967 |
| DE | 30 42 734 | 11/1980 |
| DE | 43 25 310 | 7/1993 |
| EP | 1 068 793 | 6/2000 |
| EP | 15 91 003 A1 | 11/2005 |
| FR | 2 549 345 | 7/1984 |

OTHER PUBLICATIONS

German Search Report dated Feb. 9, 2007, (4 pages).
European Search Report, Oct. 24, 2006, 5 Pages.

* cited by examiner

Primary Examiner—Árpád Fábián-Kovács

(57) ABSTRACT

The invention refers to a screen for a cleaning device of a harvester-thresher, with a screen frame, on which several screen metal sheets are supported so they can rotate around an axis, and with at least one air conducting surface, which protrudes downward beyond the screen frame, to deflect an air flow present below the screen during operation upward to the screen metal sheets. The air conducting surface may be movable jointly with the screen metal sheets.

11 Claims, 3 Drawing Sheets

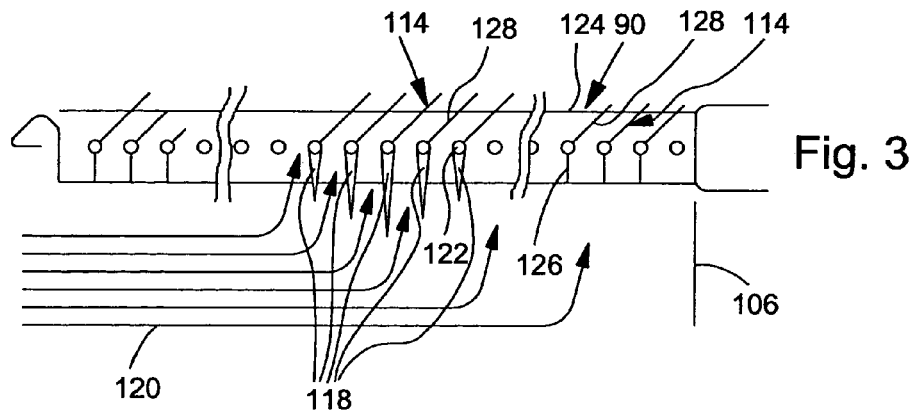
Fig. 3
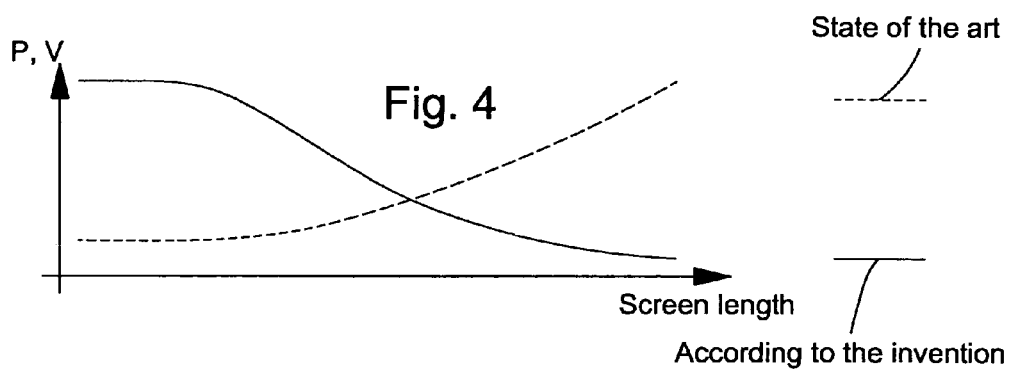
Fig. 4
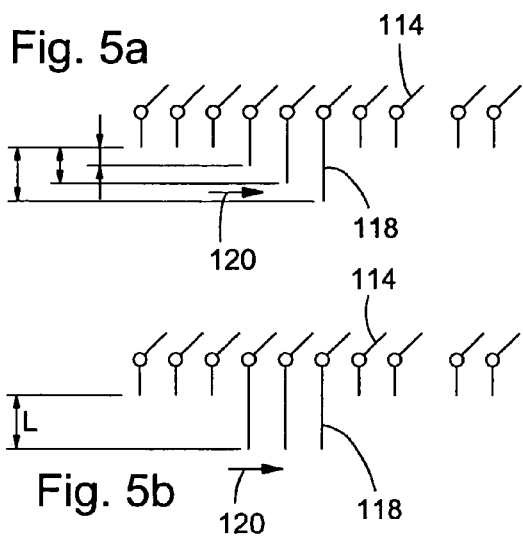
Fig. 5a
Fig. 5b
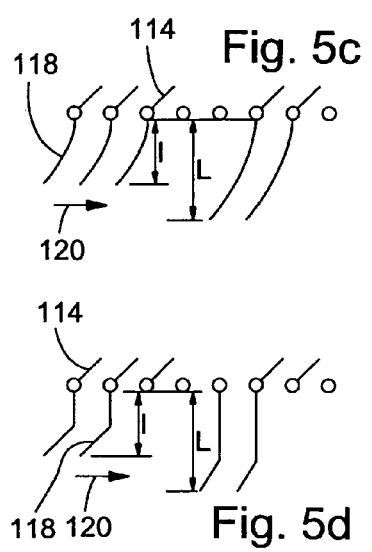
Fig. 5c
Fig. 5d

SIEVE WITH DIFFERENT LOUVERS

FIELD OF THE INVENTION

The invention relates to harvester-threshers. More particularly, it relates to grain cleaning devices for harvester-threshers. Even more particularly, it relates to louvers for such cleaning devices.

BACKGROUND OF THE INVENTION

In a harvester-thresher, there is still some chaff and short straw mixed with the threshed grain, as a rule, after the threshing and separation. The cleaning device removes these impurities from the grain. With most harvester-threshers, the cleaning device contains three main components: a blower, an upper screen, and a lower screen. The blower has its own housing, whereas the upper screen and the lower screen are located on a screen box.

An adjustable screen is constructed from a number of metal sheets, extending transversely, with rows of teeth. Each of these metal sheets is affixed to a crankshaft, which has a crank arm, which is found engaged with an adjustment rod extending axially. By means of an axial displacement of the adjustment rod, all metal sheets are simultaneously moved—that is, swiveled around their longitudinal axis. The screens are acted on with an air flow by the blower from below, which air flow, jointly with a shaking movement of the screen box, leads to a situation where the lighter impurities are carried away to the back by the air flow, whereas the heavier grain falls between the metal sheets of the screens and the grain passing through the lower screen is conveyed into the grain tank. The mixture of grain and chaff, yielded at the end of the lower screen, is conducted, as tailings, once again, to a threshing process, whereas the mixture yielded on the end of the upper screen is discharged onto the field.

The metal sheets of adjustable screens usually have an upper half, equipped with teeth, which extends from the rotating axis at an incline toward the back and upward, and a half extending from the rotating axis downward. In the state of the art, it is common to shape all metal sheets of a screen in a similar manner. Accordingly, they all have the same shape, length, and width, number of teeth, etc.

Since in many harvester-threshers, a conveying tray, which extends at an incline toward the front and downward, follows on the end of the screen downstream and is used in the case of the lower screen to convey the grain to an auger conveyor for grain, which conducts it to an elevator, which conveys it to the grain tank and which is used to convey the tailings to a tailings auger conveyor in the case of the upper screen, which returns incompletely threshed ear parts back to the threshing process through another elevator, it is possible for an accumulation of air to arise in such cleaning devices at the back end of the screen, which leads there to a higher pressure and a higher air speed of the air flow passing between the metal sheets than in the front area of the screen. The separation of the grain from the chaff and the short straw fractions takes place, accordingly, essentially in the back area of the screen, whose front area on the other hand contributes relatively little to the total throughput performance of the screen. In such cases, the theoretically possible throughput of the cleaning is not attained.

U.S. Pat. No. 3,043,427 A and DE 1 607 633 A propose the placement of several conducting crosslinks, rising transversely and in the direction of flow, against the screen underside below the screens. In this way, partial air flows with the most favorable intensities will be conducted to the individual longitudinal areas of the screen. These conducting crosslinks are affixed rigidly and the screen metal sheets cannot be adjusted. If one were to use such conducting crosslinks on a screen with adjustable metal sheets as proposed in DE 43 25 310 A, that would result in changing the flow ratios on the conducting crosslinks with an adjustment of the screen metal sheets since, with a larger screen opening, more air already flows through in front of the conducting crosslinks upward between the screen metal sheets than with a smaller screen opening. The conducting crosslinks thus would have only a relatively small effect, if the metal sheets are opened, whereas their effect is relatively large with metal sheets that are further closed. An optimal air distribution can, accordingly, be attained only for a certain, prespecified opening of the screen metal sheets, so that a reasonable adaptation possibility of the screen opening to various types of crops or crop characteristics, such as moisture or throughput, is not available U.S. Pat. No. 3,374,886 A proposes the placement of baffle plates, which can be adjusted below V-shaped screen elements and which deflect the wind upward. Such baffle plates are distributed over the entire length of the screen and are jointly adjusted in their inclination using a single lever. The screen elements themselves do not have adjustable metal sheets. If grain of different grain sizes is to be processed, then a change of the screen proves to be necessary.

SUMMARY OF THE INVENTION

In accordance to a first aspect of the invention, the proposal is to place under a screen of a cleaning device of a harvester-thresher an air conducting surface, protruding downward beyond the frame of the screen and jointly movable with the screen metal sheets. During operation, an air flow made available by the blower of the cleaning device, flows along below the screen. The flow is deflected upward, in part by the air conducting surface, and flows through the opening gap between the screen metal sheets, which are located above the air conducting surface. With an adjustment of the metal sheets around their longitudinal axis, which leads to a changed opening gap between the screen metal sheets, the angle of incidence of the air conducting surface is accordingly also changed simultaneously, which leads to a suitable adaptation of the air deflected upward by the air conducting surface, which flows through the opening gap between the screen metal sheets. If the opening gap is enlarged, the air conducting surface is set steeper into the wind at the same time, so that more air also flows through the opening gap adjacent to the air conducting surface. Analogously, the air flow is reduced by the opening gap adjacent to the air conducting surface, if the opening gap is made smaller, since the air conducting surface is then set flatter into the wind.

In this way, a suitable adjustment of the air flow along the entire length of the screen is also attained with an adjustment of the screen opening. Thus, possible throughput for the screen is increased or losses are reduced.

With respect to details, the air conducting surface can be constructed in one piece with a screen metal sheet correlated with it. A screen metal sheet is used, whose half extending downward from the rotating axis is changed in comparison to conventional screen metal sheets and retains the air conducting surface. In another embodiment, the screen metal sheet and the air conducting surface are separate elements which are affixed to one another in a detachable (for example, by screws) or nondetachable manner (for example, by a welding, soldering, or cementing connection). There is also the possibility of supporting the air conducting surface separately from the screen metal sheets on the screen frame and of connecting it, in accordance with the drive, with the adjustment drive of the screen metal sheets.

It would be conceivable, in principle, to equip all screen metal sheets of a screen with air conducting surfaces. It has turned out, however, that in many cases it is sufficient to make available one or more air conducting surfaces only in one area, which lies, with regard to the air flow current (=longitudinal direction of the screen), approximately in the middle. In this way, a sufficient fraction of the air flow made available by the blower is deflected upward and is conducted between the screen metal sheets approximately one half the length of the screen. The intensity of the air flow remaining below the back part of the screen is reduced, so that the relatively high air pressures and wind speeds, mentioned in the beginning, which lead to relatively high losses, are no longer attained there.

If more than one air conducting surface is used, it may be reasonable to shape them similarly, which reduces the number of types of air conducting surfaces to be produced and also to be kept ready in case they need to be serviced. In order to attain a specific distribution of the air flow over the length of the screen, it has proved reasonable, on the other hand, to use air conducting surfaces with different (measured in the direction of the air flow) lengths and/or shapes. In an advantageous embodiment, the air conducting surfaces are placed in such a manner that their length (in the air flow direction) is initially increased. Thus, an approximately constant air flow, which is increased opposite the opening gaps placed in front in the direction of the air flow as a result of the shadow effects of the upstream air conducting surfaces, is produced between the opening gaps placed over them between the screen metal sheets. Downstream from the longest air conducting surface, the lengths of the air conducting surfaces again decline, which also leads to a declining intensity of the air flow through the opening gaps placed over the individual air conducting surfaces.

The air conducting surfaces can be shaped flat, which is advantageous from a production-technical viewpoint. They can also be, aerodynamically, advantageously curved or bent like a spoon, against or in the direction of the air flow. There is also the possibility of equipping them with a cross section of a airplane wing or of a drop.

The air conducting surfaces, in accordance with the invention, can be used, in particular, on upper screens of cleaning devices.

They make possible a more or less continuous decline of the wind speed and the air pressure below the screen in the direction of the air flow, by deflection of a part of the air flow downward. That is true, in particular, but not only, when a closed screen box or conveying tray for the conveyance of tailings to the tailings auger conveyor or grain to the grain auger conveyor follows the back end of the screen downward.

BRIEF DESCRIPTION OF THE DRAWINGS

Five embodiment examples of the invention, described in more detail below, are shown in the drawings. The figures show the following:

FIG. 3, an enlarged, schematic side view of the upper screen of the cleaning device from FIG. 2, equipped with air conducting surfaces in accordance with the invention;

FIG. 4, a diagram for the pressure and speed distribution of the wind on the upper screen; and FIGS. 5*a*-5*d*, various possible alternative embodiments of air conducting surfaces of the upper screen.

DESCRIPTION OF THE PREFERRED EMBODIMENT

Figure 1:
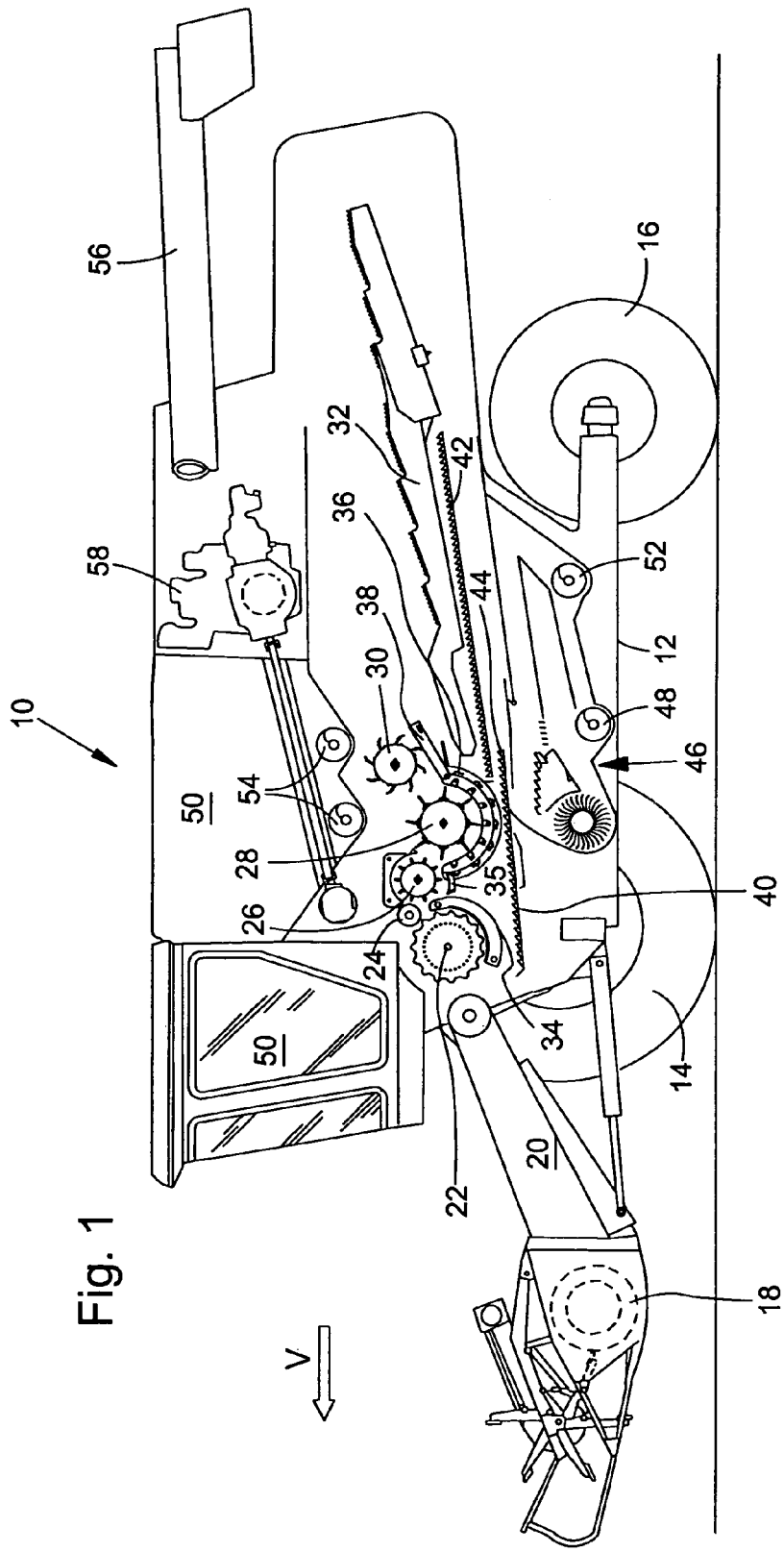
FIG. 1, a schematic side view of a harvester-thresher with a cleaning device.

FIG. 1 shows a self-propelled harvester-thresher 10 with a frame 12, which is supported on the ground via driven front wheels 14 and steerable back wheels 16 and is moved forward by them. The wheels 14 are made to rotate by means of nondepicted driving means, so as to move the harvester-thresher 10, for example, over a field which is to be harvested. Below, direction indications, front and back, refer to the direction of travel V of the harvester-thresher 10 while harvesting.

A crop-gathering device 18 in the form of a cutting mechanism is attached to the front end area of the harvester-thresher 10 in such a way that it can be removed, in order to harvest crops in the form of grain or other threshable cereals from the field and to conduct them up and back through an inclined conveyor 20 to a thresher with several drums, which comprises—situated, one after the other, in the traveling direction V—a threshing drum 22, a stripping drum 24, an overshot-working conveyor drum 26, a tangential separator 28, and a spiral drum 30. Downstream from the spiral drum 30, there is a straw shaker 32. The threshing drum 22 is surrounded by a threshing basket 34 in its lower and rear area. A closed cover 35, or one provided with openings, is located below the conveying drum 26, whereas a stationary cover is located above the conveying drum 26, and a separating basket 36 with adjustable finger elements is located below the tangential separator 28. A finger rake 38 is situated below the spiral drum 30.

A front conveying tray 40, which carries out an oscillation movement directed forward and backward in an alternating manner when in operation, is located below the thresher with multiple drums. A rear conveying tray 42 is situated below the straw shaker 32 and also carries out an oscillation movement directed backward and forward in an alternating manner when in operation. The front conveying tray 40 transports to the rear the mixture of grain, short straw, and chaff emerging downward through the threshing basket 34 and through the tangential separator 36, whereas the rear conveying tray 42 transports to the front the mixture of grain, short stray, and chaff flowing through the straw shaker 32. The rear conveying tray 42 turns over its mixture at its front end to the front conveying tray 40, which releases it downward through a rear finger rake 44. The mixture released by the front conveying tray 40 then arrives at a cleaning device 46, which is shown in detail in FIG. 2. The rear conveying tray 42 could also release its mixture directly to the cleaning device 46.

Grain cleaned by the cleaning device 46 is conducted to a nondepicted elevator by means of a grain auger conveyor 48, which elevator conveys it to a grain tank 50. A tailings auger conveyor 52 returns unthreshed ear parts to the threshing process by means of another nondepicted elevator. The chaff can be thrown out at the back of the screen device by a nonrotating chaff distributor, or it is discharged through a straw cutter (not drawn) located downstream from the straw shaker 32. The cleaned grain from the grain tank 50 can be unloaded through an unloading system with transverse auger conveyors 54 and an unloading conveyor 56.

The aforementioned systems are driven by means of a combustion engine 58 and are controlled and steered by an operator from a driver's cab 60. The different devices for threshing, conveying, cleaning, and separating are located within the frame 12. An external cover, which can be folded open for the most part, is located outside the frame 12.

It remains to be noted that the thresher with multiple drums shown here is only an embodiment example. It could also be replaced by a single transversely situated threshing drum and a downstream separating device with a straw shaker or one or more separating rotors. It is also conceivable, however, for a rotating axial separator to be used, which has a threshing section and a separating section. A single axial separator or two (or more) axial separators located next to one another are used.

Figure 2:
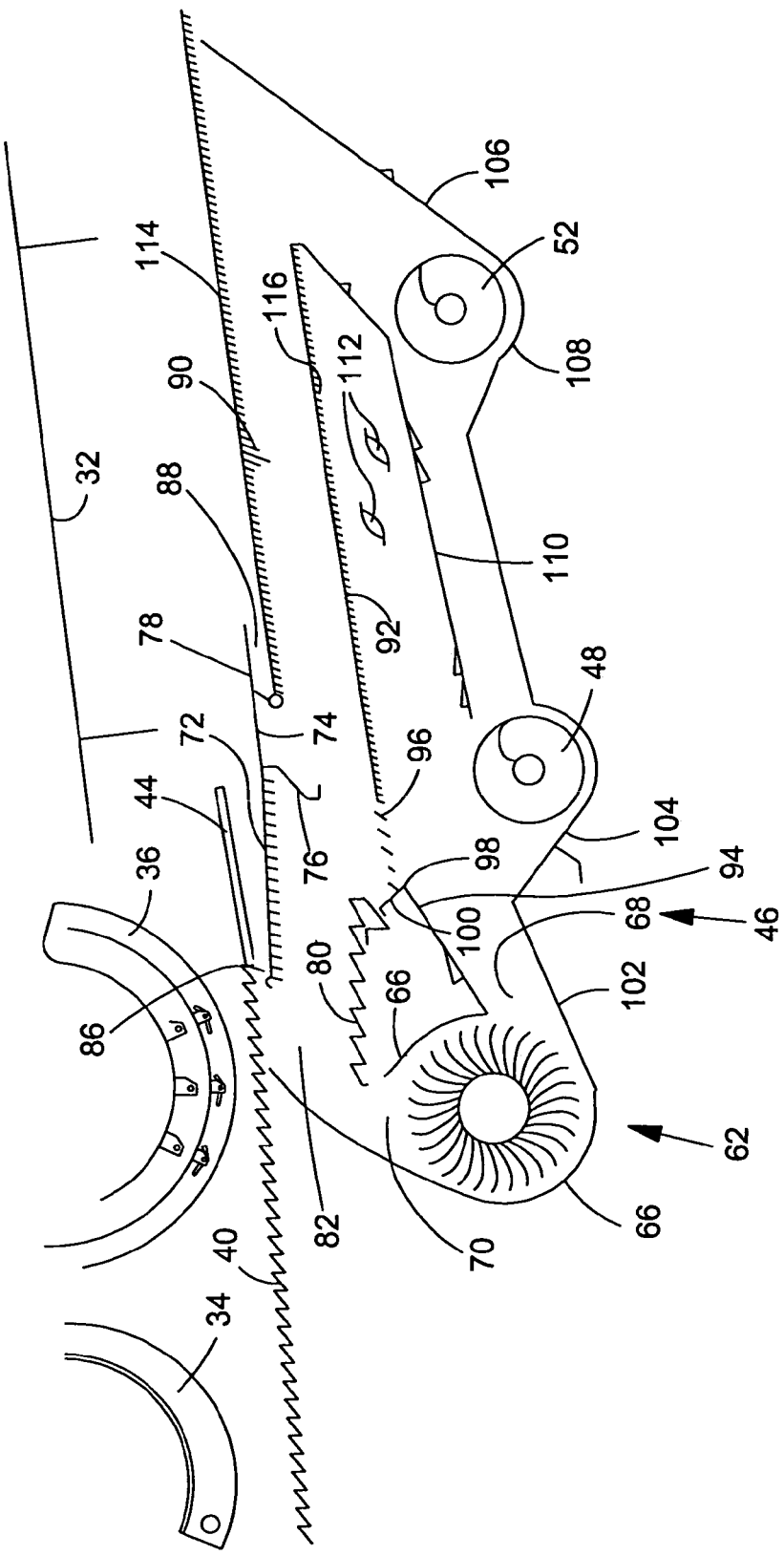
FIG. 2, an enlarged, schematic side view of the cleaning device of the harvester-thresher from FIG. 1.

The cleaning device 46 is shown in FIG. 2 in an enlarged side view. It comprises a blower 62, which is composed of a rotatable (in the counterclock direction in FIG. 2) rotor 64 and a housing 66, which encloses the rotor 64. The housing 66 has a first blower outlet 68 and a second blower outlet 70.

Furthermore, the cleaning device 46 comprises a precleaning screen 72 with screen metal sheets supported in a screen frame and located there in an adjustable angle around their longitudinal axis; the precleaning screen is located below the finger rake 44 and extends approximately from the rear edge of the front conveying tray 40 horizontally to the back and slightly upward. A closed plate 74 follows the rear end of the precleaning screen 72; it continues in a conducting surface 76 directed at an incline downward, and in a finger rake 78 situated behind the plate 74.

A conveying tray 80, under which in turn the upper part of the housing 66 of the blower 62 is situated, is located below the front half of the precleaning screen 72. The second blower outlet 70 is directed at an incline to the rear and upward and conducts the air into a channel 82 also directed to the rear and upward. A part of this air arrives at a dropping stage 86, which is located vertically between the rear end of the front conveying tray 40 and the precleaning screen 72, and already brings about a certain separation of the heavier grain and the lighter chaff, which is carried forth to the rear. The other part of the air flowing through the channel 82, partially deflected by the conducting surface 76, reaches the underside of the precleaning screen 72 and flows through it in a flow directed to the rear and upward. Grain and, to a certain extent, chaff also fall through between the screen metal sheets of the precleaning screen 72, whereas the remaining mixture of grain, short straw, and chaff at the rear of the precleaning screen 72 falls through the finger rake 78 downward.

There it arrives via another falling stage 88, at an upper screen 90, under which a lower screen 92 is located. The upper screen 90 and the lower screen 92 comprise screen metal sheets 114 and 116, which are located in a frame and can be adjusted independently of one another at an angle around their longitudinal axis as described in more detail further below. A grate 96 is located between the front end of the lower screen 92 and an upper conducting plate 94, which follows the first blower outlet 68 on the housing 66 and extends to the rear and upward at an angle. Above an edge 98 adjacent to the grate 96, the upper conducting plate 94 extends again in an area 100 at an incline to the front and upward and ends in the vicinity of the rear end of the conveying tray 80.

The grate 96 comprises five successively placed planar metal sheets in the depicted embodiment, whose longitudinal axes extend transversely to the travel direction V. The metal sheets lie in planes that run at an incline to the rear and upward. The length of the metal sheets is smaller (viewed in the direction of the air flow), the further the individual metal sheet is located in front. The metal sheets are affixed in a frame (not depicted), connected to the lower screen 92.

The lower part of the housing 66 of the blower 62 changes at the rear of the first blower outlet 68 into a lower conducting plate 102, which below the area 100 changes into a funnel-like sump 104 of the grain auger conveyor 48. A rear tray plate 106 adjoins the rear end of the upper screen 90; it extends at an incline downward and to the front and changes into a funnel-shaped sump 108 of the tailings auger conveyor 52. A lower conveying tray 110 extends from the rear end of the lower screen 92 above the rear tray plate 106 and above the tailings auger conveyor 52, at an incline to the front and downward, and ends above the sump 104 of the grain auger conveyor 48. Air conducting plates 112 are located below the lower screen 92.

The conveying trays 40, 42, and 80 and the precleaning screen 72 with the conducting surface 76 and the finger rake 78, the upper screen 90, the lower screen 92 with the grate 96, the tray plate 106, and the lower conveying tray 110, and preferably, also, the air conducting plates 112, which are all supported by oscillation on the frame 12 are set into motion, essentially directed to the front and back, by the combustion engine 58 during operation. To this end, they are placed in a screen box that oscillates in the aforementioned directions. They can move in the same or at least partially in opposite directions. In this respect, reference is made to the disclosure of DE 30 42 734 C, which is included in these documents as reference. The blower 62 with its housing 66 and the walls of the channel 82, the conducting plates 94 and 102, the sumps 104 and 108, and the grain auger conveyor 48, and the tailings auger conveyor 52 are, however, rigidly connected to the frame 12. The width of the cleaning device 46 and its parts corresponds, at least approximately, to the width of the threshing mechanism with the multiple drums and the straw shakers 32.

During operation, the blower 62 also produces in the first blower outlet 68 an air flow, which in part flows through the grate 96 to the rear and upward. The remaining air flow from the first blower outlet 68 arrives, partially guided by the air conducting plates 112, at the lower side of the lower screen 92 and flows through it. The air flow emerging through the grate 96 and the lower screen 92 arrives at the falling stage 88 and at the lower side of the upper screen 90.

The mixture of grain, short straw, and chaff, which, as already mentioned, arrives at the rear of the precleaning screen 72 through the finger rake 78 or at the upper screen 90 along its upper side, is cleaned through the upper screen 90 in a known manner by the air flow and screen metal sheets 114. The mixture of grain and chaff, emerging through the upper screen 90, arrives at the lower screen 92, whereas the remaining chaff and the short straw are conveyed away to the rear by the air flow, and preferably are discharged from the harvester-thresher 10 through the already mentioned chaff distributor or straw cutter. The mixture of chaff and grain on the lower screen 92 is cleaned through the lower screen 92 also in a known manner, wherein the grain emerging between the screen metal sheets 116 of the lower screen 92 arrives, through the lower conveying tray 110, at the grain auger conveyor 48 and the grain tank 50. The tailings are brought to the tailings auger conveyor 52 at the rear of the lower screen 92 through the tray plate 106.

The mixture of grain and chaff, also already mentioned above, passes the screen metal sheets of the precleaning screen 72, falls, in part directly (the mixture flowing through the rear area of the precleaning screen 72) and in part via the conveying tray 80 (the mixture flowing through the front area of the precleaning screen 72) above the blower 62 onto the grate 96. The mixture of grain and chaff lying on the grate 96 migrates along the upper side of the grate 96 to the rear and subsequently arrives at the lower screen 92, on which it is separated, in the manner mentioned above, into grain and tailings. The air flow flowing through the grate 96 upward and to the rear brings about a loosening of the mixture and entrains lighter particles (chaff) with it. Therefore, a loosened mixture, which is, to a certain degree, precleaned further, arrives at the lower screen 92.

The grate 96 could allow through, directly downward, a part of the grain contained in the mixture, so that it could fall into the funnel-shaped sump 104 of the grain auger conveyor 48 or its prolongation which rises forward, and from there, could be transported directly into the grain tank 50. This grain, accordingly, does not burden the lower screen 92.

On the rear of the upper screen 90, the screen box is closed by the rear tray plate 106, which adjoins the rear end of the upper screen 90 downward. In this way, a rather high air pressure arises below the rear area of the upper screen, in particular with relatively small opening gaps, between the screen metal sheets 114; the high air pressure, in turn, leads to high air speeds through the opening gaps between the screen metal sheets 114, in the rear area of the upper screen 90; they, in turn, cause undesirably high losses. In order to avoid this disadvantage, a number of air conducting surfaces 118, as shown in detail in FIG. 3, are provided approximately in the middle of the upper screen 90.

With regard to the air flow direction marked by arrows 120, only a total of five air conducting surfaces 118 are present approximately in the middle of the upper screen 90. The air conducting surfaces 118 extend below the rotating axes 122, around which the screen metal sheets 114 are supported in the screen frame 124 in a manner so that the angle can be adjusted and they protrude downward beyond the screen frame 124. The other screen metal sheets 124 of the upper screen 90, which are not equipped with air conducting surfaces 118, are conventional and comprise a lower half 126 extending downward from the rotating axis 122 and an upper half 128, which with the lower half encloses an angle; this upper half is constructed, wave-shaped, with teeth, in a known manner.

The five screen metal sheets 114 equipped with air conducting surfaces 118 also have an upper half 128, which, with the air conducting surfaces 118, encloses an angle; the half is constructed wave-shaped, with teeth, in a known manner. The air conducting surface 118, accordingly, replaces the lower half 126 with these screen metal sheets 114 and is constructed as one part with the upper half 128 or is connected to it. If the screen metal sheets 114 are swiveled around their rotating axes 122 by a manual or motor adjustment drive (not drawn in, but see EP 1 068 793 A, whose disclosure is included in the documents under consideration as reference), then the air conducting surfaces move synchronously.

The air conducting surfaces 118 are, in fact, flat in the embodiment according to FIG. 3. The air conducting surface 118, which is first in the air flow direction 120 and is drawn to the left, is shorter, measured in the vertical direction, than the second air conducting surface 118, which, in turn, is shorter than the third middle air conducting surface 118. The fourth air conducting surface is, in turn, constructed like the second air conducting surface, and the fifth air conducting surface is constructed like the first air conducting surface.

The air conducting surfaces 118 deflect upward a part of the air flow flowing below the upper screen 90, as shown with the aid of the arrows pointing in the direction of air flow 120. In this way, a lower fraction of the air flow attains the rear area of the upper screen 90, which leads, there, to a reduction of the air pressure and the wind speed. This change is shown in FIG. 4, on whose X-axis the position is shown along the length of the upper screen 90 in the direction of air flow 120, whereas the Y-axis shows the air pressure and the wind speed proportional to it. The broken-line curve shows the air pressure and the wind speed with an upper screen 90 according to the state of the art, that is, without the air conducting surfaces 118, which rise toward the rear end of the upper screen 90, as described above, whereas the solid-line curve shows the air pressure and the wind speed with an upper screen 90 in accordance with the invention, that is, with the air conducting surfaces 118. The air pressure and the wind speed continuously decline toward the rear with the upper screen 90 in accordance with the invention. In this way, the losses (grains discharged onto the field at the end of the upper screen 90 with the short straw and the chaff) of the upper screen 90 can be reduced, or with a given loss level, the throughput of the upper screen 90 can be increased.

In the embodiment shown in FIG. 3, the first three air conducting surfaces 118 are situated in such a way that their length initially increases, viewed in the direction of the air flow. Thus, between the opening gaps placed above them between the screen metal sheets 114, which is larger in comparison to the opening gaps placed in front, in the direction of the air flow 120, an approximately constant air flow is produced as a result of the shadow effects of the upstream air conducting surfaces 118. Downstream from the third (longest) air conducting surface, the lengths of the air conducting surfaces 118 again decrease, which also leads to a declining intensity of the air flow through the opening gap placed above each air conducting surface 118.

If the opening gaps between the adjacent screen metal sheets 114 are changed, in that the latter are swiveled around the rotating axes 122, the air conducting surfaces 118 are moved in the same direction with the lower halves 126 of the screen metal sheets 114. If the opening gap is increased, the air flow is simultaneously adapted—that is, increased—to the enlarged opening by the opening gap. In this way, a fraction of the air flow made available by the blower 62 is deflected upward, so that the air accumulation, which has already been mentioned several times, at the end of the upper screen 90, is not produced. Analogously, the air flow is reduced, if the opening gap between the screen metal sheets 114 is reduced.

In FIGS. 5a-5d, other possible embodiments of the upper screen 90 with air conducting surfaces 118 are shown. In the embodiment according to FIG. 5a, only the first three air conducting surfaces 118 of the embodiment according to FIG. 3 are present, whereas the fourth and fifth air conducting surfaces 118, considered in the direction of the air flow 120, are omitted or were replaced by conventional lower halves 126 of the screen metal sheets 114.

In the embodiment according to FIG. 5b, all air conducting surfaces 118 are flat and equally long. The embodiments according to FIGS. 5c and 5d comprise exactly two different shapes of air conducting surfaces 118, of which the shorter ones are placed before the longer ones, in the direction of air flow 120. The air conducting surfaces 118 according to FIG. 5c are curved like spoons against the direction of air flow 120, whereas the air conducting surfaces 118 according to FIG. 5d are bent against the direction of the air flow 120.

The depicted air conducting surfaces 118 make possible an improvement of the longitudinal distribution of the air pressure below the upper screen 90. Such air conducting surfaces 118 could also be used below the lower screen 92—above all, since on its rear, the screen box is also closed (by the lower conveying tray 110) and similar pressure conditions as under the upper screen 90 can be established. The air conducting plates 112 could then be omitted.

Having described the preferred embodiment, it will become apparent that various modifications can be made without departing from the scope of the invention as defined in the accompanying claims.

The invention claimed is:

1. A screen for a cleaning device of a harvester-thresher, comprising:
   a screen frame;
   a plurality of screen metal sheets supported on the frame for rotation around an axis;
   at least one air conducting surface, which protrudes downward beyond the screen frame for the deflection of air flow present below the screen during operation upward to the screen metal sheets, wherein the air conducting surface can move jointly with the screen metal sheets; and wherein the at least one air conducting surface is present only in one area of the screen, which is found approximately in the vicinity of the middle of the screen viewed in the direction of air flow.

2. The screen according to claim 1, wherein the at least one air conducting surface is connected to a screen metal sheets of the screen metal sheets or is formed integrally with it.

3. The screen according to claim 1, wherein the at least one air conducting surface includes several air conducting surfaces, whose length or shape is equally or differently increasing or decreasing, particularly in the direction of air flow.

4. The screen according to claim 1, wherein the at least one air conducting surface is flat or curved in or against the direction of air flow or is bent in or against the direction of air flow.

5. A cleaning device for a combine harvester including a screen for a cleaning device of a harvester-thresher, the screen comprising:
   a screen frame;
   a plurality of screen metal sheets supported on the frame for rotation around an axis;
   at least one air conducting surface, which protrudes downward beyond the screen frame for the deflection of air flow present below the screen during operation upward to the screen metal sheets, wherein the air conducting surface can move jointly with the screen metal sheets; and wherein the air conducting surface is shaped and placed in such a way that the wind speed continuously declines below the screen in the direction of air flow.

6. The cleaning device according to claim 5, wherein a screen box, closed downward, is placed on the rear of the screen.

7. The cleaning device according to claim 5, wherein the screen is an upper screen.

8. A harvester-thresher, comprising:
   a frame;
   an engine on the frame;
   a threshing device on the frame;
   a separating device on the frame;
   a cleaning device, the cleaning device further comprising a screen frame, a plurality of screen metal sheets supported on the frame for rotation around an axis, and at least one air conducting surface, wherein said at least one surface protrudes downward beyond the screen frame for the deflection of air flow present below the screen upward to the screen metal sheets, and further wherein the air conducting surface can move jointly with the screen metal sheets; and wherein the at least one air conducting surface is present only in one area of the screen, which is found approximately in the vicinity of the middle of the screen viewed in the direction of air flow.

9. The screen according to claim 8, wherein the at least one air conducting surface is connected to a screen metal sheet of the screen metal sheets or is formed integrally with it.

10. The screen according to claim 8, wherein the at least one air conducting surface includes several air conducting surfaces, whose length or shape is equally or differently increasing or decreasing, particularly in the direction of air flow.

11. The screen according to claim 8, wherein the at least one air conducting surface is flat or curved in or against the direction of air flow or is bent in or against the direction of air flow.

* * * * *